US012806929B2

(12) United States Patent
Kobayashi

(10) Patent No.: US 12,806,929 B2
(45) Date of Patent: Nov. 24, 2026

(54) TRANSPORT DEVICE AND IMAGE FORMING DEVICE

(71) Applicant: SEIKO EPSON CORPORATION, Tokyo (JP)

(72) Inventor: Kazuhiro Kobayashi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 19/078,329

(22) Filed: Mar. 13, 2025

(65) Prior Publication Data

US 2025/0289676 A1 Sep. 18, 2025

(30) Foreign Application Priority Data

Mar. 13, 2024 (JP) ................................ 2024-038755

(51) Int. Cl.
*B41J 29/17* (2006.01)
*B65H 5/06* (2006.01)

(52) U.S. Cl.
CPC .............. *B41J 29/17* (2013.01); *B65H 5/062* (2013.01); *B65H 2301/44318* (2013.01); *B65H 2301/5115* (2013.01); *B65H 2301/531* (2013.01); *B65H 2404/11* (2013.01); *B65H 2404/1314* (2013.01); *B65H 2601/2611* (2013.01); *B65H 2801/12* (2013.01); *B65H 2801/15* (2013.01); *G03G 2215/00607* (2013.01); *G03G 2215/00708* (2013.01)

(58) Field of Classification Search
CPC ...... B65H 2301/5115; B65H 2301/531; B65H 2601/2611; B65H 2601/2612; B65H 2511/521; B65H 2404/13-13171; B41J 29/17; G03G 2215/00708; G03G 2215/00607; G03G 2221/0005
See application file for complete search history.

(56) References Cited

U.S. PATENT DOCUMENTS

| | | | | |
|---|---|---|---|---|
| 9,086,661 | B2 * | 7/2015 | Arikawa | G03G 15/2025 |
| 9,487,367 | B2 * | 11/2016 | Otsuki | B65H 9/006 |
| 2009/0160120 | A1 | 6/2009 | Hirose | |

FOREIGN PATENT DOCUMENTS

| | | |
|---|---|---|
| JP | 2002108153 A | 4/2002 |
| JP | 2009154979 A | 7/2009 |

* cited by examiner

*Primary Examiner* — Jeremy R Severson
(74) *Attorney, Agent, or Firm* — CHIP LAW GROUP

(57) ABSTRACT

A transport device 3 includes a transport roller 53 that transports a medium P along a transport path TR of the medium P; a paper dust attracting roller 54 that is arranged at a position facing the transport roller 53 and that attracts paper dust clinging to the medium P; a paper dust removal section 55 that contacts the paper dust attracting roller 54; and a paper dust transport section 60 that is provided at a position adjacent to the paper dust removal section 55 and that transports the paper dust removed by the paper dust removal section 55, wherein the paper dust attracting roller 54 and the paper dust removal section 55 are configured such that contact pressure when the paper dust attracting roller 54 and the paper dust removal section 55 contact each other differs in an X-axial direction.

10 Claims, 8 Drawing Sheets

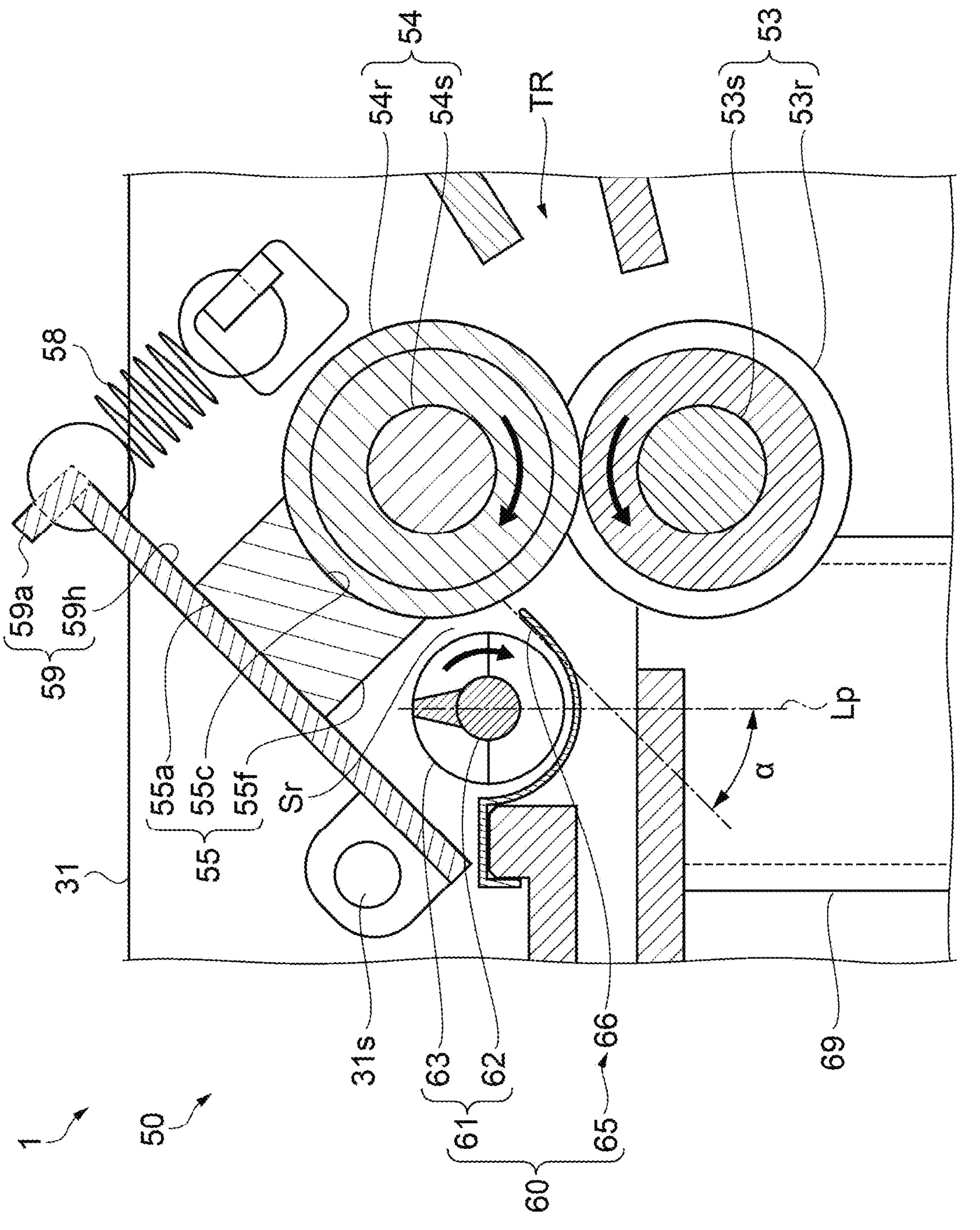
FIG. 3
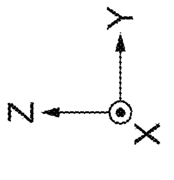

TRANSPORT DEVICE AND IMAGE FORMING DEVICE

The present application is based on, and claims priority from JP Application Serial Number 2024-038755, filed Mar. 13, 2024, the disclosure of which is hereby incorporated by reference herein in its entirety.

BACKGROUND

1. Technical Field

The present disclosure relates to a transport device and an image forming device.

2. Related Art

JP-A-2002-108153 discloses an image forming device including a paper dust removal device that removes paper dust on a recording medium. The paper dust removal device includes a paper dust removal roller, a scraping member, and a transport unit. The paper dust removal roller contacts the recording medium to remove paper dust. The scraping member scrapes off paper dust clinging to the paper dust removal roller. The transport unit transports the paper dust scraped by the scraping member along an axial direction of the paper dust removal roller in a state not in contact with the paper dust removal roller. The scraping member and the transport unit are arranged at a predetermined interval in order to form a space for temporarily retaining the paper dust scraped by the scraping member.

However, in the paper dust removal device described in JP-A-2002-108153, a lump of paper dust that has grown becomes a large lump in the axial direction of the paper dust removal roller, and there is a possibility that the paper dust is not easily transported by the transport unit.

SUMMARY

A transport device includes a transport roller that transports a medium along a transport path of the medium; a paper dust attracting roller that is arranged at a position facing the transport roller and that attracts paper dust clinging to the medium; a paper dust removal section that contacts the paper dust attracting roller and removes the paper dust attracted by the paper dust attracting roller from the paper dust attracting roller; and a paper dust transport section that is provided at a position adjacent to the paper dust removal section and that transports the paper dust removed by the paper dust removal section, wherein the paper dust attracting roller and the paper dust removal section are configured such that contact pressure when the paper dust attracting roller and the paper dust removal section contact each other differs in a longitudinal direction intersecting a transport direction of the medium.

An image forming device includes the transport device and an image forming section that forms an image on the medium, wherein the medium is transported toward the image forming section by the transport device.

BRIEF DESCRIPTION OF THE DRAWINGS

FIG. 3 is a cross-sectional view showing an S3-S3 cross section shown in FIG. 2.

DESCRIPTION OF EMBODIMENTS

Figure 1:
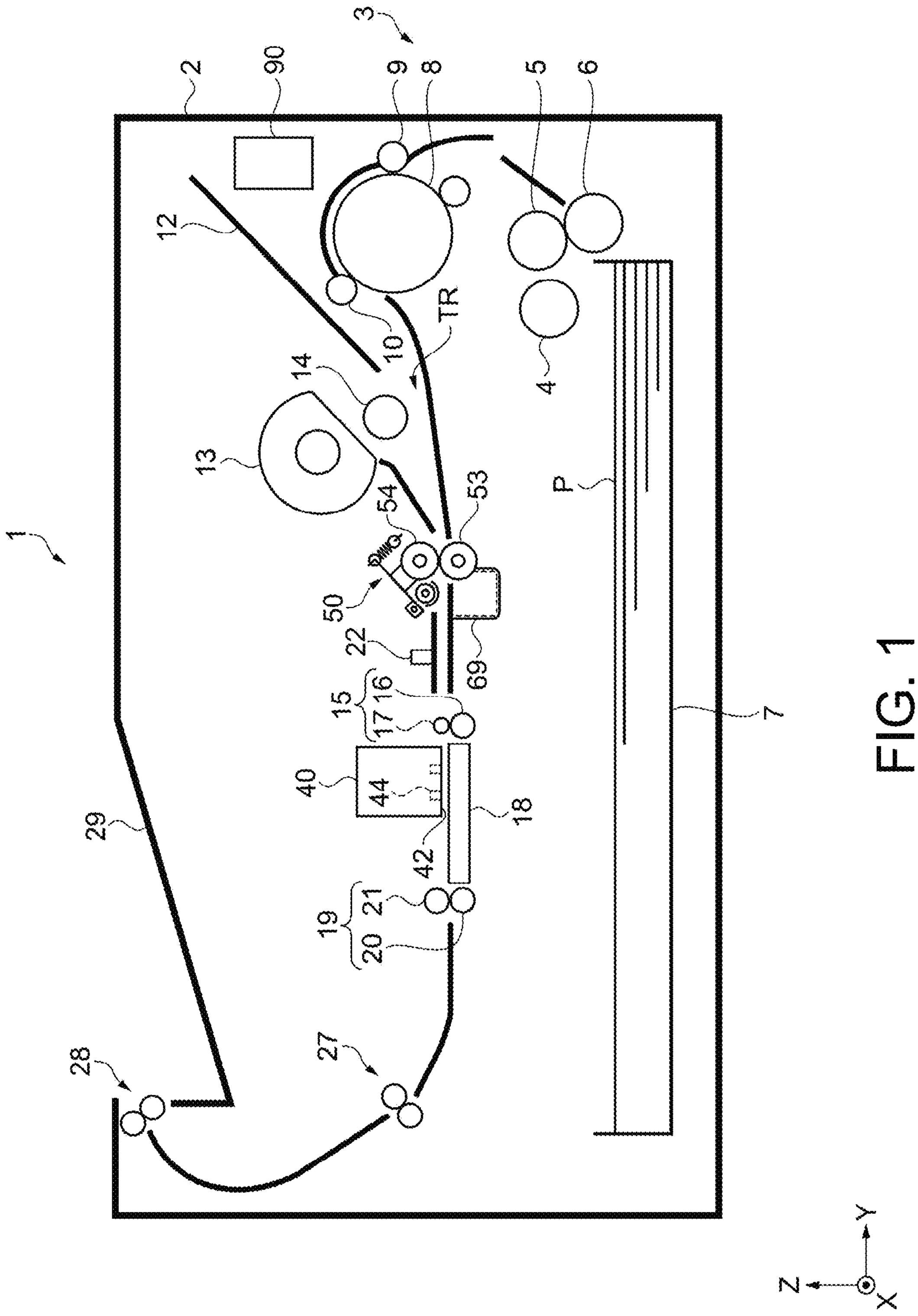
FIG. 1 is a schematic side view showing an embodiment of an image forming device.

Hereinafter, the present disclosure will be described based on embodiments. In each drawing, the same members are denoted by the same reference symbols, and a duplicate description will be omitted. In this specification, the terms "same", "identical", and "at the same time" do not necessarily mean "exactly the same". For example, in the present specification, "same", "identical", and "at the same time" include a case of being the same in consideration of a measurement error. For example, in the present specification, "same", "identical", and "at the same time" include cases where members are the same in consideration of manufacturing variations. For example, in the present specification, "same", "identical", and "at the same time" include cases where they are the same to extent that they do not impair function. Thus, for example, "both dimensions are the same" means that the dimensional difference between the two is within ±5 percent of one dimension, particularly desirably within ±3 percent, taking into account measurement errors and manufacturing variations of the member.

1. First Embodiment

An image forming device 1 is, for example, an inkjet type printer capable of forming an image on a recording sheet or the like, which is an example of a medium P.

In each drawing, X, Y, and Z represent three spatial axes orthogonal to each other. In the present specification, directions along these axes are referred to as an X-axial direction, a Y-axial direction, and a Z-axial direction. In a case where a direction is specified, a positive direction is referred to as "+", a negative direction is referred to as "−", positive and negative signs are used together for direction notation, a direction in which an arrow in each drawing is directed is referred to as a + direction, and a direction opposite to the arrow is referred to as a − direction.

The Z-axial direction indicates the gravity direction, a +Z direction indicates a vertically upward direction, and a −Z direction indicates a vertically downward direction. A plane including an X-axis and a Y-axis is described as an X-Y plane, a plane including the X-axis and a Z-axis as an X-Z plane, and a plane including the Y-axis and the Z-axis as a Y-Z plane. The X-Y plane is a horizontal plane. Further, the three spatial axes of X, Y, and Z, which do not limit a positive direction and a negative direction, will be described as the X-axis, the Y-axis, and the Z-axis.

The X-axial direction is a width direction of the image forming device 1, a width direction of the medium P on which an image is formed, and a width direction of a transport path TR on which the medium P is transported. A +X direction is a right side and a −X direction is a left side when viewed from an operator positioned on a front surface side of the image forming device 1.

The Y-axial direction is a depth direction of the image forming device 1 and is a direction along a transport direction of the medium P at the time of image formation. A +Y direction is a direction from a front surface to a rear surface of the image forming device 1, and a −Y direction is a direction from the rear surface to the front surface of the image forming device 1. In the present embodiment, among side surfaces constituting the periphery of the image forming device 1, a side surface in the +Y direction is the rear surface of the image forming device 1, and a side surface in the −Y direction is the front surface of the image forming device 1.

In the following description, a direction in which medium P is conveyed is referred to as "downstream", and the opposite direction is referred to as "upstream" in some cases.

As shown in FIG. 1, the image forming device 1 includes a housing 2. The housing 2 defines the outer periphery of the image forming device 1. The housing 2 forms the front surface, which is a side surface on a −Y direction side of the image forming device 1, and the rear surface, which is a side surface on a +Y direction side of the image forming device 1. The housing 2 forms a right side surface, which is a side surface on a +X direction side, and a left side surface, which is a side surface on a −X direction side of the image forming device 1. The housing 2 forms an upper surface, which is a surface on a +Z direction side and a bottom surface, which is a surface on a −Z direction side of the image forming device 1. The housing 2 may be constituted by a plurality of members.

The image forming device 1 includes a transport device 3 that transports the medium P, an image forming section 40 that forms an image on the medium P that is transported, and a control section 90. Hereinafter, the configuration of the image forming device 1 will be described along the transport path TR in which the medium P is transported. In the present embodiment, the medium P is transported such that a central section of the medium P in the width direction is positioned at a center Cw of the transport path TR in the X-axial direction.

The image forming device 1 includes a medium accommodation cassette 7 on a bottom surface side that is a −Z direction side inside the housing 2. The medium P is accommodated in the medium accommodation cassette 7. The medium accommodation cassette 7 is provided so as to be detachable from a front surface side of the device.

The transport device 3 includes a pickup roller 4 driven by a motor (not shown) on a +Z direction side of the medium accommodation cassette 7. The pickup roller 4 can advance and retract with respect to the medium P accommodated in the medium accommodation cassette 7. The pickup roller 4 feeds the medium P from the medium accommodation cassette 7 in the +Y direction by rotating in contact with the medium P accommodated in the medium accommodation cassette 7.

The transport device 3 includes a feed roller 5, which is driven by a motor (not shown), and a separation roller 6, to which rotational torque is applied by a torque limiter (not shown) on a downstream side of the medium accommodation cassette 7. The medium P fed from the medium accommodation cassette 7 is separated by being nipped by the feed roller 5 and the separation roller 6, and is conveyed further downstream.

The transport device 3 includes an inversion roller 8 driven by a motor (not shown) downstream of the feed roller 5 and the separation roller 6. A first nip roller 9 and a second nip roller 10 are provided around the inversion roller 8. The medium P is nipped by the inversion roller 8 and the first nip roller 9, and is further nipped and transported by the inversion roller 8 and the second nip roller 10. The transport direction of the medium P is inverted from the +Y direction to the −Y direction by the inversion roller 8, and the medium P is transported downstream.

The transport device 3 includes a paper dust removal mechanism 50 downstream of the inversion roller 8. The paper dust removal mechanism 50 includes a transport roller 53 driven by a motor (not shown), and a paper dust attracting roller 54 that can be driven to rotate. The paper dust removal mechanism 50 will be described later. The medium P is transported downstream by the transport roller 53 and the paper dust attracting roller 54.

The transport device 3 includes a first conveying roller pair 15 downstream of the paper dust removal mechanism 50. The first conveying roller pair 15 includes a drive roller 16 driven by a motor (not shown) and a driven roller 17 that can be driven to rotate. The medium P is transported to a position facing the image forming section 40 by the first conveying roller pair 15.

In the transport path TR of the image forming device 1, in addition to a medium transport path on which the medium P is transported from the medium accommodation cassette 7 toward the image forming section 40, a medium feed path from a medium support section 12 is provided. The medium support section 12 supports the medium P in an inclined posture.

The transport device 3 includes a feed roller 13 driven by a motor (not shown) and a separation roller 14 in the medium feed path. The medium P supported by the medium support section 12 is transported toward the downstream of the transport path TR by the feed roller 13. Rotational torque is applied to the separation roller 14 by a torque limiter (not shown).

The transport device 3 includes a medium detection section 22 upstream of the first conveying roller pair 15. The medium detection section 22 detects the medium P. As the medium detection section 22, a reflection-type photosensor, a transmission-type photosensor, or the like that is arranged so as to be able to emit light toward the medium P can be adopted. For example, the control section 90 (to be described later) can position a leading edge of the medium P with respect to the image forming section 40 based on detection information of the medium detection section 22. For example, the control section 90 can position the medium P at a start position at which image formation is started.

The image forming section 40 forms an image by ejecting ink onto the medium P from a plurality of nozzles 44 provided on an ejection surface 42. Ink is an example of liquid. The image forming section 40 is a so-called line head in which the plurality of the nozzles 44 that eject ink are arranged so as to cover the entire area in a medium width direction.

The image forming section 40 is elongated in the medium width direction and is configured as a liquid ejection head that can form an image across the entire medium width without moving in the medium width direction. The ejection surface 42 is a surface facing the medium P. The ejection surface 42 may also be referred to as a liquid ejection surface or a nozzle surface.

The image forming device 1 includes a liquid accommodation section (not shown). Ink ejected from the image forming section 40 is supplied to the image forming section 40 from the liquid accommodation section through a supply tube (not shown).

The transport device 3 includes a facing section 18 at a position facing the ejection surface 42 of the image forming section 40. The facing section 18 defines a gap between the medium P and the ejection surface 42 by supporting the medium P.

The transport device 3 includes a second conveying roller pair 19 downstream of the image forming section 40. The second conveying roller pair 19 includes a drive roller 20 driven by a motor (not shown) and a driven roller 21 that can be driven to rotate. The medium P on which an image was formed is conveyed downstream by the second conveying roller pair 19.

The transport device 3 includes a third conveying roller pair 27 downstream of the second conveying roller pair 19. The transport device 3 includes a discharge roller pair 28 downstream of the third conveying roller pair 27. The path between the third conveying roller pair 27 and the discharge roller pair 28 constitutes a face down discharge path. The medium P on which an image was formed is discharged to a discharge tray 29 by the discharge roller pair 28 in a state in which a surface on which an image was just formed is set to a lower surface that is a surface on a −Z direction side.

The image forming device 1 includes a control section 90. The control section 90 may be configured as a circuit that includes one or more processors, one or more dedicated hardware circuits such as application specific integrated circuits that perform at least some of the processes, or a combination thereof.

The processor executes various processes according to a computer program. The processor includes a CPU and memories such as a RAM and a ROM. The memory stores program codes or commands configured to cause the CPU to execute the processes. Memory, or a computer readable medium, includes any readable medium that can be accessed by a general-purpose or dedicated computer.

The control section 90 controls the entire image forming device 1. For example, the control section 90 controls the transport device 3 to transport the medium P from the medium accommodation cassette 7 toward the image forming section 40. The control section 90 controls the image forming section 40 to form an image on the medium P being transported by ejecting ink. The control section 90 controls the transport device 3 to discharge the medium P on which an image is formed to the discharge tray 29.

Figure 2:
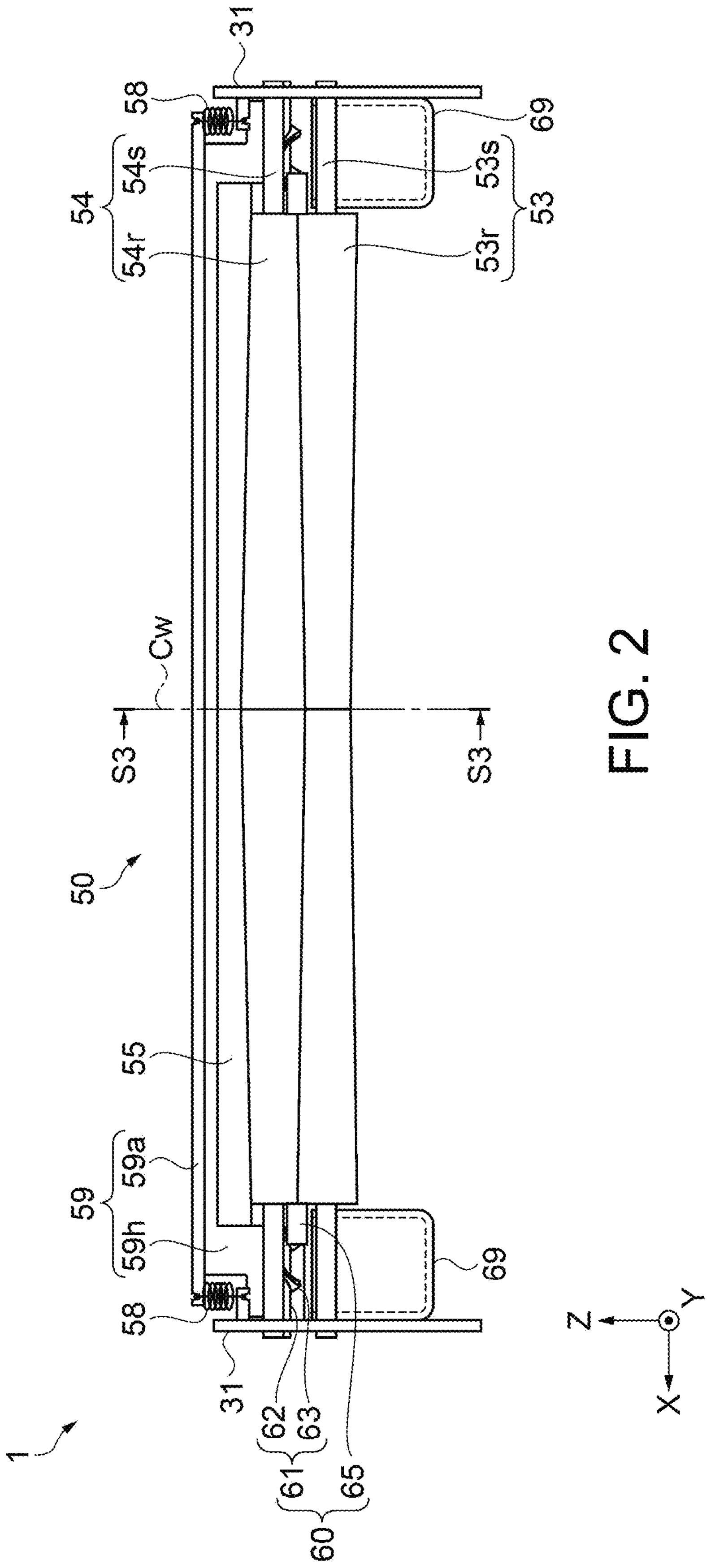
FIG. 2 is a side view showing a paper dust removal mechanism included in the image forming device.

Next, the paper dust removal mechanism 50 will be described. As shown in FIGS. 2 and 3, the paper dust removal mechanism 50 includes the transport roller 53, the paper dust attracting roller 54, a paper dust removal section 55, and a paper dust transport section 60. Further, the paper dust removal mechanism 50 includes a support member 59, springs 58, and paper dust accommodation sections 69.

The transport roller 53 transports the medium P along the transport path TR by rotating in a state where the medium P is sandwiched between the transport roller 53 and the paper dust attracting roller 54. The transport roller 53 is constituted by a rotation shaft **53*s* and a roller 53*r* provided on the rotation shaft 53*s*. The roller 53*r* of the transport roller 53** is formed so that the width in the X-axial direction is wider than the width of the medium P.

The rotation shaft **53*s* of the transport roller 53 has an axial center along the X-axial direction and extends in the X-axial direction. The rotation shaft 53*s* is supported by side plates 31 so as to be rotatable around the axial center. A drive motor (not shown) is provided at an end of the rotation shaft 53*s* of the transport roller 53**.

The paper dust attracting roller 54 attracts paper dust clinging to the medium P by coming into contact with the medium P. The paper dust attracting roller 54 is provided at a position facing the transport roller 53, and is in contact with the transport roller 53. The paper dust attracting roller 54 of the present embodiment is provided on a +Z direction side above the transport roller 53. The paper dust attracting roller 54 contacts the surface of the medium P that contacts the separation roller 6.

The paper dust attracting roller 54 is constituted by a rotation shaft **54*s* and a roller 54*r* provided on the rotation shaft 54*s*. The roller 54*r* of the paper dust attracting roller 54 is formed so that the width in the X-axial direction is wider than the width of the medium P. The rotation shaft 54*s* of the paper dust attracting roller 54 has an axial center along the X-axial direction and extends in the X-axial direction. The rotation shaft 54*s* is supported by the side plates 31** so as to be rotatable around the axial center.

When the transport roller 53 rotates counterclockwise (see the arrow in FIG. 3) as viewed from the +X direction, the paper dust attracting roller 54 is driven to rotate clockwise (see the arrow in FIG. 3) as viewed from the +X direction. The paper dust attracting roller 54 of the present embodiment includes the roller **54*r*** whose surface is easily charged.

For example, in a case where the medium P is paper such as recording sheet, paper dust contains cellulose or calcium carbonate, which is easily positively charged, as a component. In this case, a surface of the roller **54*r*** is desirably made of a material that is likely to become negatively charged when it comes into contact with the medium P.

In this case, as the roller **54*r***, for example, a roller formed of polyethylene, polypropylene, vinyl chloride, fluororesin, or the like, or a roller whose surface is coated with fluorine, or the like can be adopted.

Figure 6:
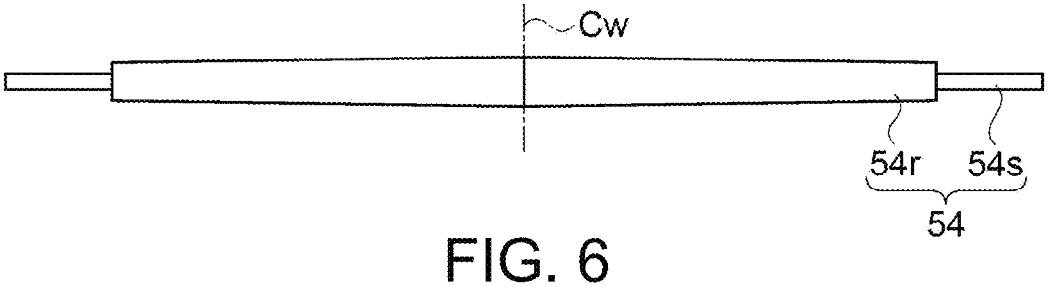
FIG. 6 is a view showing a paper dust attracting roller.

As shown in FIGS. 2 and 6, in the present embodiment, a diameter of the roller **54*r* of the paper dust attracting roller 54 is largest at a central section in the longitudinal direction along the X-axial direction and decreases toward both ends. The paper dust attracting roller 54 is provided at a position where the central section of the roller 54*r*** in the longitudinal direction is positioned at the center Cw of the transport path TR in the X-axial direction.

In FIG. 2, FIG. 4, FIG. 5, and FIG. 12, the position of the center Cw in the X-axial direction of the transport path TR is indicated by a single dot chain line. In FIGS. 6 to 9, the position of the center Cw in the X-axial direction of the transport path TR when the transport roller 53, the paper dust attracting roller 54, and the paper dust removal section 55 are provided in the image forming device 1 is indicated by a single dot chain line.

By contacting the paper dust attracting roller 54, the paper dust removal section 55 removes paper dust attracted by the paper dust attracting roller 54 from the paper dust attracting roller 54. As shown in FIG. 3, the paper dust removal section 55 is provided at a position facing the paper dust attracting roller 54, and is in contact with the roller **54*r* of the paper dust attracting roller 54. The paper dust removal section 55 of the present embodiment is provided on a +Z direction side above the paper dust attracting roller 54. The paper dust removal section 55 extends along the paper dust attracting roller 54** in the X-axial direction.

As shown in FIG. 2, the paper dust removal section 55 is formed to have a width in the X-axial direction larger than the width of the roller 54*r* of the paper dust attracting roller 54 and the width of the medium P. The paper dust removal section 55 is provided at a position where a central section of the paper dust removal section 55 in the longitudinal direction along the X-axial direction is positioned at the center Cw of the transport path TR in the X-axial direction. The paper dust removal section 55 is composed of a sponge-like member that easily charges the roller 54*r* of the paper dust attracting roller 54.

Figure 4:
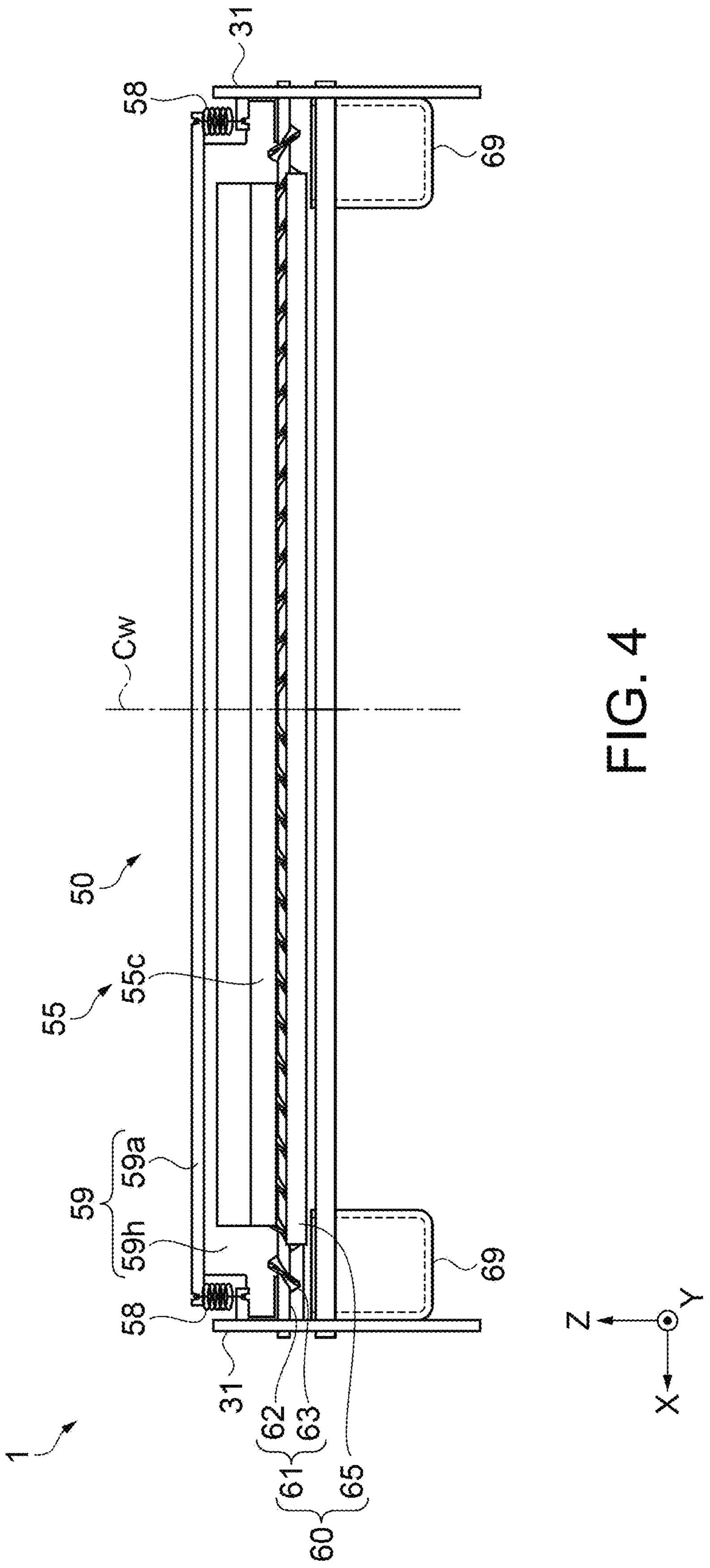
FIG. 4 is a side view showing the paper dust removal mechanism included in the image forming device.

As shown in FIGS. 3 and 4, the paper dust removal section 55 includes a contact section 55*c* that is in contact with the roller 54*r*, a side surface section 55*f* that is a surface facing the paper dust transport section 60, and an attachment section 55*a* which is a surface opposite to the contact section 55*c*. In FIG. 4, the transport roller 53 and the paper dust attracting roller 54 are not shown for the sake of description.

As shown in FIGS. 2 to 4, the support member 59 that supports the paper dust removal section 55 has a longitudinal direction in the X-axial direction in which the paper dust removal section 55 extends, and includes an arm section 59*a* and a holding section 59*h*. The support member 59 is rotatably provided about the support shafts 31*s* provided on the side plates 31. The support member 59 is biased in a direction toward the roller 54*r* by biasing forces of the springs 58.

The paper dust removal section 55 is supported by the support member 59, as the attachment section 55*a* is fixed to the holding section 59*h* of the support member 59. The paper dust removal section 55 is supported by the support member 59 and is pressed against the roller 54*r* of the paper dust attracting roller 54. The spring 58 is an example of a pressing member that presses the paper dust removal section 55 toward the roller 54*r* of the paper dust attracting roller 54.

By this, the paper dust removal section 55 scrapes off paper dust clinging to the roller 54*r* of the paper dust attracting roller 54. Furthermore, by this, the paper dust removal section 55 is configured such that the contact section 55*c* is pressed against the roller 54*r* of the rotating paper dust attracting roller 54, thereby frictionally charging a surface of the roller 54*r*.

In this case, it is desirable that the contact section 55*c* of the paper dust removal section 55 is made of a material that tends to negatively charge the roller 54*r* when it is in contact with the roller 54*r* of the paper dust attracting roller 54. In the present embodiment, the contact section 55*c* of the paper dust removal section 55 is made of a material positioned in a triboelectric series between a positively chargeable material constituting the medium P and a negatively chargeable material constituting a surface of the roller 54*r*.

In this case, since the contact section 55*c* of the paper dust removal section 55 is likely to become positively charged while in contact with the roller 54*r* of the paper dust attracting roller 54, scraped paper dust is unlikely to cling to the paper dust removal section 55.

For example, it is assumed that a surface of the roller 54*r* is formed of polyethylene, polypropylene, vinyl chloride, fluororesin, or the like. In this case, the paper dust removal section 55 is made of, for example, urethane foam.

In the present embodiment, the paper dust attracting roller 54 and the paper dust removal section 55 are configured such that a contact pressure when the roller 54*r* and the contact section 55*c* contact each other differs in the X-axial direction. The X-axial direction is an example of a longitudinal direction intersecting the transport direction of the medium P. By this, paper dust collected from the paper dust attracting roller 54 by the paper dust removal section 55 is prevented from becoming a large lump in the X-axial direction.

In the present embodiment, the contact section 55*c* of the paper dust removal section 55 has a plane shape extending in the X-axial direction. When the paper dust removal section 55 is pressed against the roller 54*r*, the contact section 55*c* is deformed following a surface of the roller 54*r* (see FIG. 3). As described above, the roller 54*r* of the paper dust attracting roller 54 is provided so that a diameter of a central section positioned at the center Cw in the X-axial direction is the largest, and the diameter decreases toward both ends.

Therefore, a contact pressure when the roller 54*r* and the contact section 55*c* contact each other is largest in the X-axial direction at the center Cw where the contact section 55*c* and a central section of the roller 54*r* in the longitudinal direction contact each other. A contact pressure when the roller 54*r* and the contact section 55*c* contact each other decreases as the contact position between the contact section 55*c* and the roller 54*r* in the X-axial direction approaches the ends from the central section in the longitudinal direction of the roller 54*r*.

Further, for this reason, when the roller 54*r* and the contact section 55*c* contact each other, the moment acting on paper dust becomes the largest at the center Cw in the X-axial direction. For this reason, for example, even in a case where paper dust is gathered and becomes a large lump in the X-axial direction, the lump of the paper dust is easily crushed at the center Cw in the X-axial direction, and the paper dust is prevented from becoming a lump.

Figure 7:
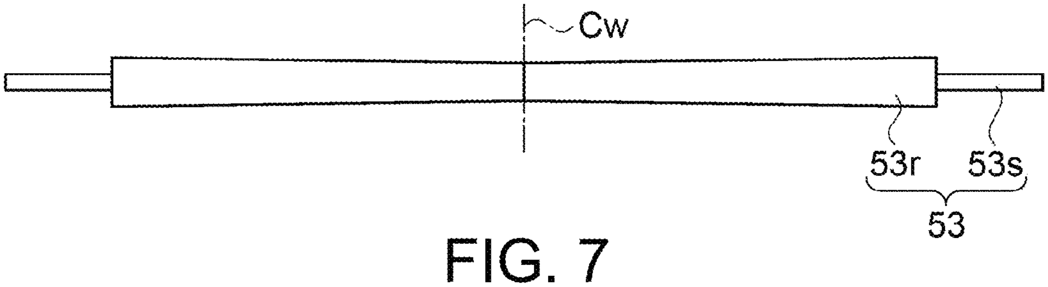
FIG. 7 is a view showing a transport roller.

The transport roller 53 sandwich the medium P between the roller 53*r* and the roller 54*r* of the paper dust attracting roller 54 in the X-axial direction. Therefore, as shown in FIG. 7, in the present embodiment, the roller 53*r* of the transport roller 53 is set so that a diameter of a central section is smallest in the longitudinal direction along the X-axial direction, and the diameter increases toward both ends. As shown in FIG. 2, the transport roller 53 is provided at a position where a central section of roller 53*r* in the longitudinal direction is positioned at the center Cw of the transport path TR in the X-axial direction.

Figure 8:
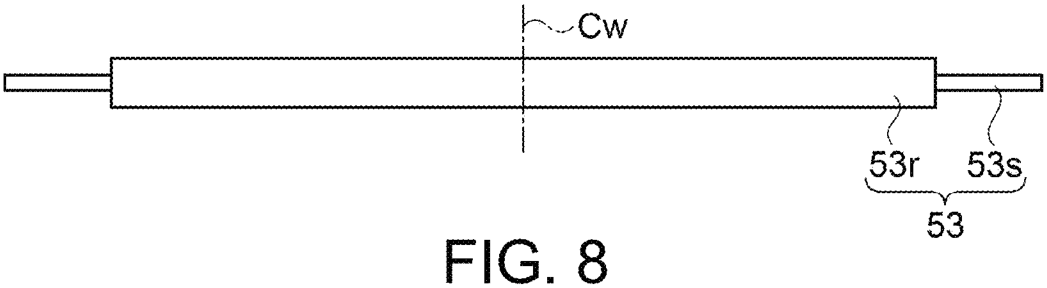
FIG. 8 is a view showing an other embodiment of the transport roller.

When at least one of the roller 53*r* and the roller 54*r* is made of a deformable member, then, as shown in FIG. 8, the roller 53*r* of the transport roller 53 may have a cylindrical shape having the same diameter in the longitudinal direction.

Figure 5:
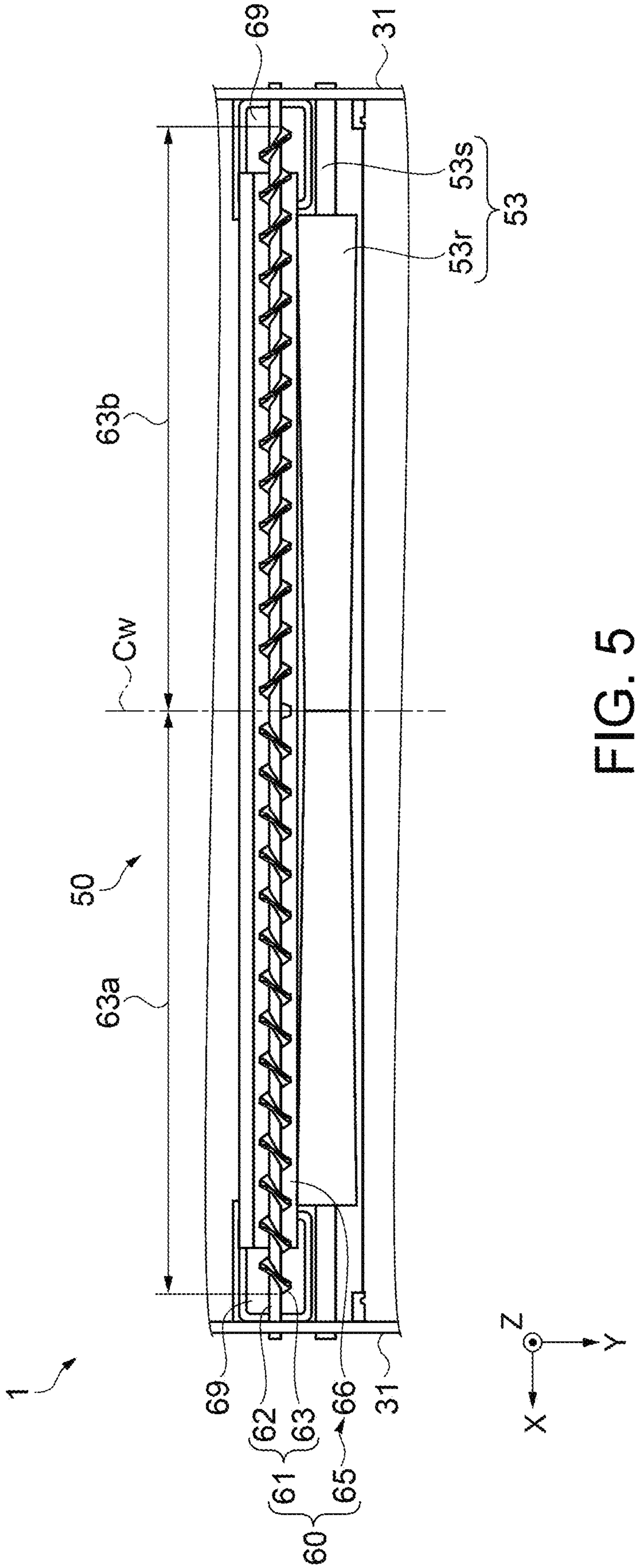
FIG. 5 is a plan view showing the paper dust removal mechanism included in the image forming device.

The paper dust transport section 60 transports paper dust removed by the paper dust removal section 55. As shown in FIGS. 2 to 5, the paper dust transport section 60 of the present embodiment is a so-called auger screw feeder using an auger screw 61. The auger screw 61 is provided at a position adjacent to the paper dust removal section 55. The auger screw 61 is provided at a position adjacent to the paper dust attracting roller 54. In FIG. 5, for the sake of description, the paper dust attracting roller 54, the paper dust removal section 55, the support member 59, and the spring 58 are not shown.

More specifically, the auger screw 61 is provided at a position on a −Y direction side and a −Z direction side of the paper dust attracting roller 54 where the paper dust removal section 55 is pressed. The auger screw 61 is adjacent, at a predetermined interval, to a position of the paper dust attracting roller 54 against which the paper dust removal section 55 is pressed. By this, a space Sr in which paper dust can temporarily stay is formed between the auger screw 61 and the paper dust attracting roller 54.

As shown in FIGS. 3 to 5, the auger screw 61 includes a shaft 62 and a spiral 63 formed spirally around the shaft 62. The spiral 63 includes a first spiral 63*a* and a second spiral 63*b*. The shaft 62 has an axial center along the X-axial direction and extends in the X-axial direction.

The shaft 62 and the spiral 63 of the auger screw 61 have dimensions larger than those of the paper dust removal section 55 in the X-axial direction. The auger screw 61 is provided at a position where a central section of the spiral 63 in the longitudinal direction along the X-axial direction is positioned at the center Cw of the transport path TR in the X-axial direction. The position of the central section in the longitudinal direction of the spiral 63 is the same as the position of the central section in the longitudinal direction of the shaft 62.

The shaft 62 is supported by the side plates 31 so as to be rotatable around the axial center. An auger screw drive gear (not shown) is provided at an end of the shaft 62 in the X-axial direction, and the shaft 62 rotates clockwise (see the arrow in FIG. 3) when viewed from the +X direction by a drive motor (not shown) being driven.

The first spiral 63*a* is provided from the central section of the shaft 62 in the longitudinal direction toward an end in the +X direction. The end of the shaft 62 in the +X direction is an example of one end of the shaft 62. The first spiral 63*a* is set in a winding direction that allows paper dust to be transported toward the end in the +X direction along the axial center of the shaft 62 by rotation of the shaft 62 around the axial center.

The second spiral 63*b* is provided from the central section of the shaft 62 in the longitudinal direction toward an end in the −X direction. The end of the shaft 62 in the −X direction is an example of an other end of the shaft 62. The second spiral 63*b* is set in a winding direction that allows paper dust to be transported toward the end in the −X direction along the axial center of the shaft 62 by rotation of the shaft 62 around the axial center.

For this reason, the first spiral 63*a* and the second spiral 63*b* have different winding directions, and paper dust is transported toward both ends from the central section of the shaft 62 in the longitudinal direction by the shaft 62 rotating around the axial center.

As shown in FIGS. 2 and 5, a guide member 65 extends in the X-axial direction and has a dimension in the X-axial direction that is larger than the roller 54*r* of the paper dust attracting roller 54. The guide member 65 of the paper dust transport section 60 has a dimension larger than the paper dust removal section 55 in the X-axial direction.

Both ends of the guide member 65 in the X-axial direction are positioned on a +Z direction side, which is vertically above an accommodation entrance of each paper dust accommodation section 69. The accommodation entrance of the paper dust accommodation section 69 opens in the +Z direction. The guide member 65 is provided at a position where a central section in the longitudinal direction along the X-axial direction is positioned at the center Cw of the transport path TR in the X-axial direction.

As shown in FIG. 3, the guide member 65 includes a receiving surface 66 for receiving paper dust. The receiving surface 66 is arranged between the paper dust attracting roller 54 and the auger screw 61, and on a −Z direction side below the paper dust removal section 55.

The receiving surface 66 is provided so that an angle α between the receiving surface 66 and a vertical line Lp passing through the axial center of the shaft 62 of the auger screw 61 is 0° to 45°, desirably 30° to 45°. In the present embodiment, the angle α is set to 45°.

If the angle α is larger than 45°, paper dust may stay on the receiving surface 66 and may not be smoothly guided to the auger screw 61. If the angle α is smaller than 0°, paper dust may not be received on the receiving surface 66. If the angle α is smaller than 30°, the gap between a base end section of the receiving surface 66 and the auger screw 61 becomes large, and paper dust may not be satisfactorily guided to the auger screw 61.

The paper dust accommodation section 69 accommodates paper dust transported by the paper dust transport section 60. As shown in FIGS. 2 and 5, the paper dust accommodation section 69 includes the accommodation entrance that opens in the +Z direction. The accommodation entrances of the paper dust accommodation sections 69 are positioned on a −Z direction side vertically below both ends in the X-axial direction of the guide member 65.

Therefore, a pair of the paper dust accommodation sections 69 is provided at positions outside both ends of the transport path TR in the X-axial direction. The paper dust accommodation sections 69 may be detachably provided with respect to the housing 2. In this case, each paper dust accommodation section 69 may be detachably provided to the housing 2 along the X-axial direction. Alternatively, a pair of the paper dust accommodation sections 69 may be integrally provided and removable from a −Y direction side with respect to the housing 2.

Next, paper dust removal by the paper dust removal mechanism 50 will be described with reference to FIGS. 2 and 5. When paper dust removal is performed, the control section 90 drives and controls the transport roller 53 to rotate the transport roller 53 in a counterclockwise direction (see the arrow in FIG. 3) when viewed from the +X direction. By this, the paper dust attracting roller 54 is driven to rotate clockwise (see the arrow in FIG. 3) when viewed from the +X direction.

The medium P transported from upstream and nipped between the rotating transport roller 53 and the paper dust attracting roller 54 is transported downstream. At this time, a surface of the medium P on a +Z direction side serving as an image forming surface and paper dust on the medium P come into contact with a surface of the roller 54*r* of the rotating paper dust attracting roller 54.

The surface of the roller 54*r* of the paper dust attracting roller 54 is frictionally charged by the paper dust removal section 55. For this reason, by coming into contact with the surface of the roller 54*r* of the paper dust attracting roller 54, paper dust on the medium P is electrostatically attracted by the roller 54*r* of the paper dust attracting roller 54 and is removed from the medium P.

Paper dust removed from the medium P and clinging to the surface of the roller 54*r* is scraped off by the paper dust removal section 55. The scraped paper dust falls toward the receiving surface 66 of the guide member 65 or the spiral 63 through the space Sr while being suppressed from becoming a large lump in the X-axial direction.

When paper dust is accommodated in the paper dust accommodation sections 69, the control section 90 drives and controls the auger screw 61 to rotate the auger screw 61 clockwise as viewed from the +X direction. By this, paper dust that has fallen onto the receiving surface 66 of the guide member 65 or the spiral 63 is transported from the central section toward both ends in the longitudinal direction of the shaft 62.

Paper dust transported by the paper dust transport section 60 falls from both ends of the guide member 65 in the X-axial direction, passes through the accommodation entrances of the paper dust accommodation sections 69, and is accommodated in each paper dust accommodation section 69.

As described above, according to the transport device 3 and the image forming device 1 of the first embodiment, the following effects can be obtained.

The transport device 3 includes the transport roller 53 that transports the medium P along the transport path TR of the medium P. The transport device 3 includes the paper dust attracting roller 54 that is arranged at a position facing the transport roller 53 and attracts paper dust clinging to the medium P. The transport device 3 includes the paper dust removal section 55 that contacts the paper dust attracting roller 54 and removes the paper dust attracted by the paper dust attracting roller 54 from the paper dust attracting roller 54. The transport device 3 includes the paper dust transport section 60 that is provided at a position adjacent to the paper dust removal section 55 and transports paper dust removed by the paper dust removal section 55. The paper dust attracting roller 54 and the paper dust removal section 55 are configured such that contact pressure when the paper dust attracting roller 54 and the paper dust removal section 55 contact each other differs in the X-axial direction.

According to this, paper dust removed by the paper dust removal section 55 is prevented from becoming a large lump in the X-axial direction. Therefore, according to the transport device 3 of the present embodiment, paper dust is easily transported by the paper dust transport section 60.

A diameter of the paper dust attracting roller 54 is largest at a central section in the X-axial direction and decreases toward both ends. According to this configuration, contact pressure when the paper dust attracting roller 54 and the paper dust removal section 55 contact each other can be made to differ in the X-axial direction with a simple configuration.

A diameter of the transport roller 53 is smallest at the central section in the X-axial direction and increases toward both ends. According to this, it is possible to apply a uniform pressure in the X-axial direction to the medium P sandwiched between the transport roller 53 and the paper dust attracting roller 54, and thus it is possible to stably transport the medium P.

The paper dust transport section 60 has a larger dimension in the X-axial direction than the paper dust removal section 55. According to this, paper dust can be transported across the width of the paper dust removal section 55 in the X-axial direction.

The paper dust transport section 60 is the auger screw 61 in which the spiral 63 is provided on the shaft 62 having an axial center along the X-axial direction, and paper dust is transported by rotation of the shaft 62 around the axial center. According to this, paper dust can be transported with a simple configuration.

The spiral 63 includes a first spiral 63*a* extending from the central section of the shaft 62 in the X-axial direction toward one end and a second spiral 63*b* extending from the central section toward an other end. The first spiral 63*a* and the second spiral 63*b* have different winding directions. As the shaft 62 rotates, paper dust is transported from the central section of the shaft 62 toward both ends thereof.

According to this, even in a case where paper dust removed by the paper dust removal section 55 is gathered into a large lump in the X-axial direction, the paper dust is crushed by the paper dust transport section 60. Therefore, paper dust can be smoothly transported.

The transport device 3 further includes springs 58 that press the paper dust removal section 55 toward the paper dust attracting roller 54. The paper dust removal section 55 is composed of a sponge-like member. According to this, the paper dust attracting roller 54 is easily frictionally charged by the paper dust removal section 55. Therefore, paper dust is more easily attracted by the paper dust attracting roller 54.

The image forming device 1 includes the transport device 3 and the image forming section 40 that forms an image on medium P. The medium P is transported toward the image forming section 40 by the transport device 3. According to this, the image forming device 1 can form an image on the medium P from which paper dust was removed.

Although the transport device 3 according to the above-described embodiment of the present disclosure basically includes the above-described configuration, it is of course possible to change or omit parts of the configuration within a range not departing from the gist of the present disclosure. Although the image forming device 1 according to the above-described embodiment of the present disclosure basically includes the above-described configuration, it is of course possible to change or omit parts of the configuration within a range not departing from the gist of the present disclosure.

The above-described embodiment and other embodiments described below can be implemented in combination with each other to the extent that they are not technically contradictory. Hereinafter, other embodiments will be described.

Figure 9:
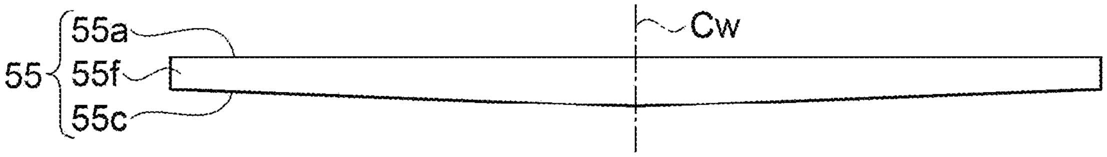
FIG. 9 is a view showing an other embodiment of a paper dust removal section.

In the above-described embodiment, if a contact pressure when the roller 54*r* and the contact section 55*c* contact each other differs in the X-axial direction, the contact section 55*c* of the paper dust removal section 55 may not have a plane shape extending in the X-axial direction. For example, as shown in FIG. 9, a inclined surface may be configured such that a dimension from the attachment section 55*a* to the contact section 55*c* is the largest at a central section in the longitudinal direction and decreases toward both ends.

It is assumed that the paper dust removal section 55 of this embodiment is attached to the support member 59. In this case, the paper dust removal section 55 has the largest protrusion amount toward the roller 54*r* of the paper dust attracting roller 54 at the central section in the longitudinal direction positioned at the center Cw in the X-axial direction. In this case, the protrusion amount of the paper dust removal section 55 decreases toward both ends from the central section in the longitudinal direction positioned at the center Cw.

Even in this case, the paper dust attracting roller 54 and the paper dust removal section 55 are configured such that contact pressure when the roller 54*r* and the contact section 55*c* contact each other differs in the X-axial direction. In this embodiment, the roller 54*r* of the paper dust attracting roller 54 may have a cylindrical shape with the same diameter across the longitudinal direction.

In this embodiment, the roller 53*r* of the transport roller 53 may have a cylindrical shape with the same diameter across the longitudinal direction. As described above, according to the transport device 3 and the image forming device 1 of the present embodiment, the following effects can be obtained.

In the paper dust removal section 55, the central section in the longitudinal direction has the largest protrusion amount with respect to the paper dust attracting roller 54, and the protrusion amount decreases toward both ends. According to this, the roller 54*r* and the roller 53*r* can be formed in a cylindrical shape with the same diameter across the X-axial direction. Therefore, the paper dust removal section 55 prevents paper dust from becoming a large lump in the X-axial direction while suppressing the occurrence of wrinkles or the like in the medium P during transport by the transport roller 53 and the paper dust attracting roller 54. Therefore, according to the transport device 3 according to this embodiment, paper dust is easily transported by the paper dust transport section 60.

The image forming device 1 includes the transport device 3 and the image forming section 40 that forms an image on medium P. The medium P is transported toward the image forming section 40 by the transport device 3. According to this, the image forming device 1 according to this embodiment can form an image on the medium P from which paper dust was removed.

Figure 10:
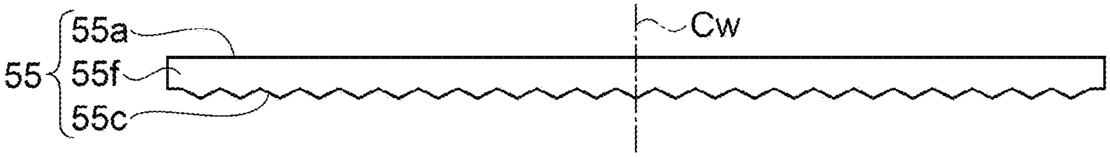
FIG. 10 is a view showing an other embodiment of the paper dust removal section.

In the above-described embodiment, the contact section 55*c* of the paper dust removal section 55 may have a wavy shape in which a plurality of protrusions and indentations are continuous in the longitudinal direction. For example, as shown in FIG. 10, the contact section 55*c* may have a sawtooth shape in which a plurality of inclined surfaces are continuous in the longitudinal direction. In this case, a central section in the longitudinal direction of the contact section 55*c* may be arranged so that the tip of the saw teeth constituting the sawtooth shape is positioned.

When the paper dust removal section 55 of this embodiment is attached to the support member 59, the protrusion amount of the paper dust removal section 55 toward the roller 54*r* of the paper dust attracting roller 54 continuously changes in the X-axial direction.

Even in this case, the paper dust attracting roller 54 and the paper dust removal section 55 are configured such that contact pressure when the roller 54*r* and the contact section 55*c* contact each other differs in the X-axial direction. In this embodiment, the roller 54*r* of the paper dust attracting roller 54 may have a cylindrical shape with the same diameter across the longitudinal direction.

In this embodiment, the roller 53*r* of the transport roller 53 may have a cylindrical shape with the same diameter across the longitudinal direction. Also in the transport device 3 according to this embodiment, paper dust removed by the paper dust removal section 55 is prevented from becoming a large lump in the X-axial direction. Therefore, according to the transport device 3 according to this embodiment, paper dust is easily transported by the paper dust transport section 60. Furthermore, according to the transport device 3 according to this embodiment, it is possible to suppress the occurrence of wrinkles or the like in the medium P during transport by the transport roller 53 and the paper dust attracting roller 54.

Figure 11:
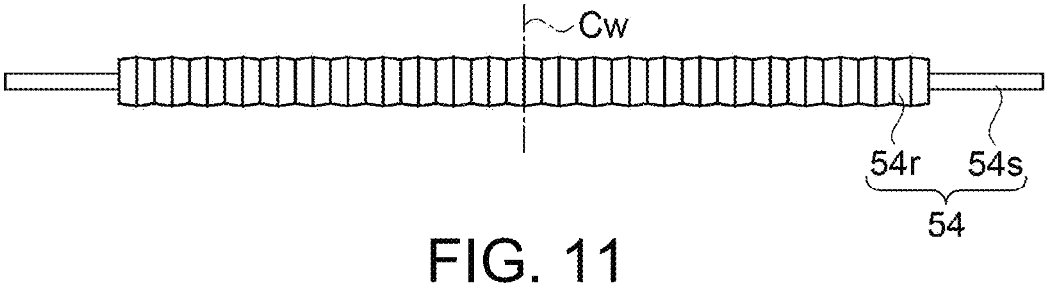
FIG. 11 is a view showing an other embodiment of the paper dust attracting roller.

In the above-described embodiment, the roller 54*r* of the paper dust attracting roller 54 may have a wavy shape in which a plurality of protrusions and indentations are continuous in the longitudinal direction. For example, as shown in FIG. 11, the roller 54*r* may have a shape in which a plurality of circular truncated cones are continuously arranged in the longitudinal direction. In this case, the roller 54*r* has a diameter that continuously changes in the longitudinal direction. In this case, the wavy shape may be arranged such that the large-diameter portion of the diameter that continuously changes in the longitudinal direction is positioned at a central section in the longitudinal direction of the roller 54*r*.

In this embodiment, the contact section 55*c* of the paper dust removal section 55 may have a plane shape similar to the contact section 55*c* of the paper dust removal section 55 in the first embodiment. Even in this case, the paper dust attracting roller 54 and the paper dust removal section 55 are configured such that contact pressure when the roller 54*r* and the contact section 55*c* contact each other differs in the X-axial direction.

In this embodiment, the roller 53*r* of the transport roller 53 may have a wavy shape in which a plurality of protrusions and indentations are continuous in the longitudinal direction, similarly to the roller 54*r* of the paper dust attracting roller 54. For example, similar to the roller 54*r* shown in FIG. 11, the roller 53*r* may have a shape in which a plurality of circular truncated cones are arranged continuously in the longitudinal direction. In this case, the roller 53*r* has a diameter that continuously changes in the longitudinal direction. In this case, the wavy shape may be arranged such that the small-diameter portion of the diameter that continuously changes in the longitudinal direction is positioned at a central section in the longitudinal direction of the roller 53*r*.

Also in the transport device 3 according to this embodiment, paper dust removed by the paper dust removal section 55 is prevented from becoming a large lump in the X-axial direction. Therefore, according to the transport device 3 according to this embodiment, paper dust is easily transported by the paper dust transport section 60.

Alternatively, when at least one of the roller 53*r* and the roller 54*r* is made of a deformable member, the roller 53*r* of transport roller 53 may have a cylindrical shape having the same diameter in the longitudinal direction. Also in the transport device 3 according to this embodiment, paper dust removed by the paper dust removal section 55 is prevented from becoming a large lump in the X-axial direction. Therefore, according to the transport device 3 according to this embodiment, paper dust is easily transported by the paper dust transport section 60.

Figure 12:
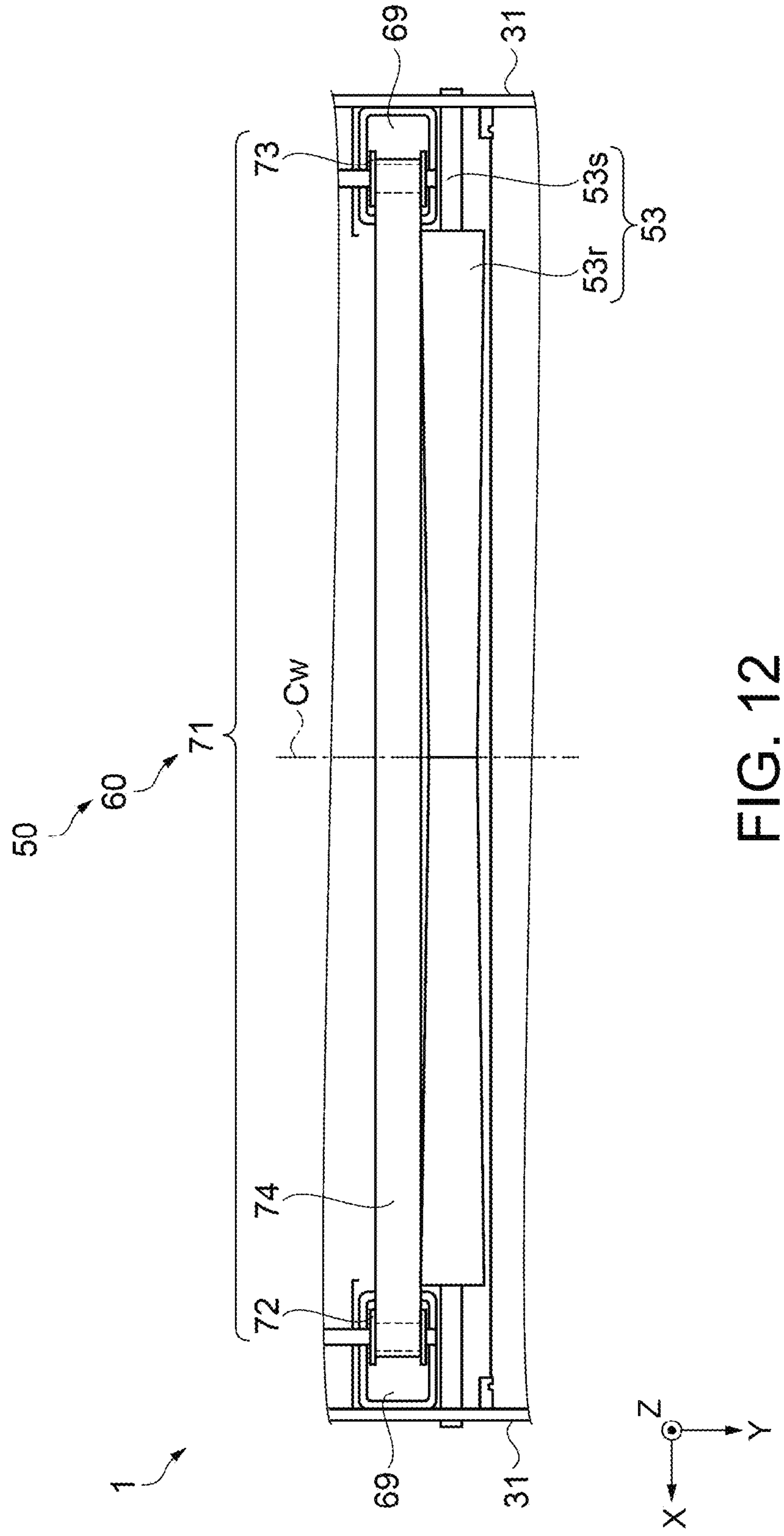
FIG. 12 is a view showing an other embodiment of a paper dust transport section.

In the above-described embodiment, the paper dust transport section 60 may not necessarily be the auger screw 61. For example, as shown in FIG. 12, the paper dust transport section 60 may be a transport belt 71. In this embodiment, the transport belt 71 includes a drive pulley 72, a driven pulley 73, and an endless belt 74 wound around the drive pulley 72 and the driven pulley 73. In FIG. 12, for the sake of description, the paper dust attracting roller 54, the paper dust removal section 55, the support member 59, and the spring 58 are not shown.

Similar to the auger screw 61 in the first embodiment, the transport belt 71 in this embodiment is provided at a position adjacent to the paper dust removal section 55. Similar to the auger screw 61 in the first embodiment, the transport belt 71 in this embodiment is provided at a position adjacent to the paper dust attracting roller 54.

The drive pulley 72 is provided vertically above the accommodation entrance of the paper dust accommodation section 69 on a +X direction side. The drive pulley 72, driven by a drive motor (not shown), is rotatably provided around an axial center along the Y-axial direction. The driven pulley 73 is provided vertically above the accommodation entrance of the paper dust accommodation section 69 on a −X direction side. The driven pulley 73 is provided so as to be rotatable around an axial center along the Y-axial direction. The drive pulley 72 and the driven pulley 73 are provided on a −Z direction side of the paper dust removal section 55.

The endless belt 74 extends in the X-axial direction by being wound around the drive pulley 72 and the driven pulley 73. According to this, a surface on a +Z direction side of the endless belt 74 wound around the drive pulley 72 and the driven pulley 73 is positioned on a −Z direction side of the paper dust removal section 55. In this embodiment, the surface on the +Z direction side of the endless belt 74 wound around the drive pulley 72 and the driven pulley 73 functions as a transport surface that receives and transports paper dust removed by the paper dust removal section 55.

The transport surface may have a dimension larger than that of the roller 54*r* of the paper dust attracting roller 54 in the X-axial direction. The transport surface may have a dimension larger than that of the paper dust removal section 55 in the X-axial direction.

For example, in this embodiment, it is assumed that the control section 90 causes paper dust received by the transport surface of the endless belt 74 to be accommodated in the paper dust accommodation section 69 on a +X direction side. In this case, the control section 90 rotates the drive pulley 72 counterclockwise when viewed from the +Y direction by controlling the drive motor of the transport belt 71. By this, paper dust received by the transport surface of the endless belt 74 is transported in the +X direction by the transport belt 71 and is accommodated in the paper dust accommodation section 69 through the accommodation entrance of the paper dust accommodation section 69 on the +X direction side.

For example, in this embodiment, it is assumed that the control section 90 causes paper dust received by the transport surface of the endless belt 74 to be accommodated in the paper dust accommodation section 69 on a −X direction side. In this case, the control section 90 rotates the drive pulley 72 clockwise when viewed from the +Y direction by controlling the drive motor of the transport belt 71. By this, paper dust received by the transport surface of the endless belt 74 is transported in the −X direction by the transport belt 71 and is accommodated in the paper dust accommodation section 69 through the accommodation entrance of the paper dust accommodation section 69 on the −X direction side.

As described above, according to the transport device 3 and the image forming device 1 of the present embodiment, the following effects can be obtained.

The paper dust transport section 60 is the transport belt 71 including the drive pulley 72, the driven pulley 73, and the endless belt 74 wound around the drive pulley 72 and the driven pulley 73, and paper dust is transported by the transport belt 71. According to this, the transport device 3 according to this embodiment can transport paper dust with a simple configuration.

The image forming device 1 includes the transport device 3 and the image forming section 40 that forms an image on medium P. The medium P is transported toward the image forming section 40 by the transport device 3. According to this, the image forming device 1 according to this embodiment can form an image on the medium P from which paper dust was removed.

In the above-described embodiment, a dimension of the paper dust removal section 55 in the longitudinal direction may be smaller than a width dimension of the medium P. Also in this case, a dimension of the paper dust attracting roller 54 in the longitudinal direction of the roller 54*r* may be set to be larger than a width dimension of the medium P. In this case, a plurality of the paper dust removal sections 55 may be arranged in the X-axial direction on the support member 59.

In the above-described embodiment, the paper dust removal section 55 may be formed of a flexurally deformable thin plate member. In this case, the paper dust removal section 55 may be provided at a position that is bent and deformed when the contact section 55*c* is pressed against the roller 54*r* of the paper dust attracting roller 54. By this, the paper dust removal section 55 scrapes off paper dust clinging to the roller 54*r* of the paper dust attracting roller 54.

Further, by this, the paper dust removal section 55 is configured to be pressed against the roller 54*r* of the rotating paper dust attracting roller 54 to frictionally charge a surface of the roller 54*r*. In this case, for example, the paper dust removal section 55 may be fixed to the side plate 31. In this case, the paper dust removal mechanism 50 may not include the support member 59 and the spring 58.

What is claimed is:

1. A transport device comprising:

a transport roller that transports a medium along a transport path of the medium;

a paper dust attracting roller that is arranged at a position facing the transport roller and that attracts paper dust clinging to the medium;

a paper dust removal section that contacts the paper dust attracting roller and removes the paper dust attracted by the paper dust attracting roller from the paper dust attracting roller; and a paper dust transport section that is provided at a position adjacent to the paper dust removal section and that transports the paper dust removed by the paper dust removal section, wherein the paper dust attracting roller and the paper dust removal section are configured such that contact pressure when the paper dust attracting roller and the paper dust removal section contact each other differs in a longitudinal direction intersecting a transport direction of the medium.

2. The transport device according to claim 1, wherein a diameter of the paper dust attracting roller is largest at a central section in the longitudinal direction and decreases toward both ends.

3. The transport device according to claim 2, wherein a diameter of the transport roller is smallest at a central section in the longitudinal direction and increases toward both ends.

4. The transport device according to claim 1, wherein in the paper dust removal section, a central section in the longitudinal direction has a largest protrusion amount with respect to the paper dust attracting roller, and protrusion amount decreases toward both ends.

5. The transport device according to claim 1, wherein the paper dust transport section has a larger dimension in the longitudinal direction than the paper dust removal section.

6. The transport device according to claim 1, wherein the paper dust transport section is a transport belt that includes a drive pulley, a driven pulley, and an endless belt wound around the drive pulley and the driven pulley and the paper dust is transported by the transport belt.

7. The transport device according to claim 1, wherein the paper dust transport section is an auger screw in which a spiral is provided on a shaft having an axial center along the longitudinal direction and the paper dust is transported by rotation of the shaft around the axial center.

8. The transport device according to claim 7, wherein the spiral includes a first spiral extending from a central section of the shaft in the longitudinal direction toward one end of the shaft and a second spiral extending from the central section toward an other end of the shaft, and the first spiral and the second spiral have different winding directions and the paper dust is transported from the central section toward both ends of the shaft by rotation of the shaft.

9. The transport device according to claim 1, further comprising:

a pressing member that presses the paper dust removal section toward the paper dust attracting roller, wherein the paper dust removal section is composed of a sponge-like member.

10. An image forming device comprising:

the transport device according to claim 1 and an image forming section that forms an image on the medium, wherein the medium is transported toward the image forming section by the transport device.

* * * * *